US011409044B2

(12) United States Patent
Su et al.

(10) Patent No.: US 11,409,044 B2
(45) Date of Patent: Aug. 9, 2022

(54) INTEGRATED POLARIZATION ROTATION AND SPLITTING USING MODE HYBRIDIZATION BETWEEN MULTPLE CORE STRUCTURES

(71) Applicant: Analog Photonics LLC, Boston, MA (US)

(72) Inventors: Zhan Su, Boston, MA (US); Erman Timurdogan, Somerville, MA (US); Michael Robert Watts, Hingham, MA (US)

(73) Assignee: Analog Photonics LLC, Boston, MA (US)

( * ) Notice: Subject to any disclaimer, the term of this patent is extended or adjusted under 35 U.S.C. 154(b) by 0 days.

(21) Appl. No.: 17/245,385

(22) Filed: Apr. 30, 2021

(65) Prior Publication Data
US 2021/0341675 A1 Nov. 4, 2021

Related U.S. Application Data

(60) Provisional application No. 63/018,635, filed on May 1, 2020.

(51) Int. Cl.
*G02B 6/12* (2006.01)
*G02B 6/126* (2006.01)
(Continued)

(52) U.S. Cl.
CPC ....... *G02B 6/2766* (2013.01); *G02B 6/12004* (2013.01); *G02B 6/126* (2013.01);
(Continued)

(58) Field of Classification Search
CPC ............ G02B 6/12002; G02B 6/12004; G02B 6/1228; G02B 6/125; G02B 6/126;
(Continued)

(56) References Cited

U.S. PATENT DOCUMENTS

| 7,072,532 B2 | 7/2006 | Watts | |
|---|---|---|---|
| 7,095,920 B1 * | 8/2006 | Little | G02B 6/12002 385/14 |

(Continued)

FOREIGN PATENT DOCUMENTS

| CN | 204536588 U | * | 8/2015 |
|---|---|---|---|
| CN | 105223647 A | * | 1/2016 |
| CN | 105866885 A | * | 8/2016 |

OTHER PUBLICATIONS

Dai et al., "Mode Conversion in Tapered Submicron Silicon Ridge Optical Waveguides", Optical Society of America, vol. 20, No. 12, May 31, 2021.

*Primary Examiner* — Ryan A Lepisto
(74) *Attorney, Agent, or Firm* — Young Basile Hanlon & MacFarlane, P.C.

(57) ABSTRACT

A polarization rotator structure includes: a first core structure formed at a first layer, extending from the first end to a second end, and a second core structure formed at a second layer that is at a different depth than the first layer and formed in proximity to the first core structure. The first core structure and the second core structure provide mode hybridization between at least two orthogonally polarized waveguide modes of the PRS. An optical splitter structure is optically coupled at a first end to the second end of the PRS, and optically coupled at a second end to at least two optical waveguides, and includes: a first core structure that is contiguous with at least one of the first or second core structures of the PRS, and a second core structure that is separate from both of the first and second core structures of the PRS.

20 Claims, 17 Drawing Sheets

(51) Int. Cl.
*G02B 6/27* (2006.01)
*G02B 6/14* (2006.01)
*G02B 6/122* (2006.01)
*G02B 6/125* (2006.01)

(52) U.S. Cl.
CPC .......... *G02B 6/276* (2013.01); *G02B 6/2726* (2013.01); *G02B 6/2773* (2013.01); *G02B 6/12002* (2013.01); *G02B 6/125* (2013.01); *G02B 6/1228* (2013.01); *G02B 6/14* (2013.01); *G02B 6/2733* (2013.01)

(58) Field of Classification Search
CPC ...... G02B 6/14; G02B 6/2726; G02B 6/2733; G02B 6/276; G02B 6/2766; G02B 6/2773
See application file for complete search history.

(56) References Cited

U.S. PATENT DOCUMENTS

| | | | |
|---|---|---|---|
| 7,702,188 B2 * | 4/2010 | Little | G02B 6/126 385/5 |
| 7,792,403 B1 | 9/2010 | Little et al. | |
| 8,750,651 B2 * | 6/2014 | Chen | G02B 6/126 385/11 |
| 8,948,549 B2 | 2/2015 | Picard et al. | |
| 9,122,006 B1 * | 9/2015 | Roth | G02B 6/126 |
| 9,329,344 B2 * | 5/2016 | Anderson | G02B 6/2706 |
| 9,400,354 B2 * | 7/2016 | Dumais | G02B 6/126 |
| 9,645,312 B2 * | 5/2017 | Barwicz | G02B 27/283 |
| 9,646,639 B2 * | 5/2017 | Van Orden | G11B 5/3163 |
| 9,746,607 B2 * | 8/2017 | Collins | G02B 6/1228 |
| 9,989,702 B2 * | 6/2018 | Doany | G02B 6/125 |
| 10,036,851 B1 * | 7/2018 | Peng | G11B 5/6088 |
| 10,241,273 B2 * | 3/2019 | Tu | G02B 6/2766 |
| 10,302,866 B2 * | 5/2019 | Lin | G02B 6/126 |
| 10,310,185 B1 * | 6/2019 | Lin | G02B 6/276 |
| 10,367,598 B2 * | 7/2019 | Testa | H04J 14/06 |
| 10,401,566 B2 * | 9/2019 | Park | G02B 6/126 |
| 10,429,582 B1 * | 10/2019 | Bian | G02B 6/1228 |
| 10,488,585 B2 * | 11/2019 | An | G02B 6/105 |
| 10,809,456 B2 * | 10/2020 | Lee | G02B 6/305 |
| 10,955,615 B2 | 3/2021 | Picard et al. | |
| 10,983,200 B1 * | 4/2021 | Shen | G01S 17/58 |
| 11,042,050 B1 * | 6/2021 | Lee | G02B 6/2766 |
| 11,105,978 B2 * | 8/2021 | Bian | G02B 6/1228 |
| 11,275,210 B1 * | 3/2022 | Thompson | G02F 1/3133 |
| 2015/0338577 A1 | 11/2015 | Shi et al. | |
| 2016/0246005 A1 | 8/2016 | Liu et al. | |
| 2017/0023735 A1 * | 1/2017 | Barwicz | G02B 6/2773 |
| 2017/0068046 A1 | 3/2017 | Bickham et al. | |
| 2017/0176680 A1 | 6/2017 | Oka | |
| 2018/0149810 A1 * | 5/2018 | Park | G02B 6/12007 |
| 2018/0231713 A1 | 8/2018 | Picard | |
| 2018/0314005 A1 | 11/2018 | Lin et al. | |
| 2019/0025506 A1 * | 1/2019 | Park | G02B 6/1228 |
| 2021/0239905 A1 * | 8/2021 | Baba | G02B 6/1228 |

* cited by examiner

Mode1

X = −4        $TE_{11}$

X = 0        $TE_{11}$

X = 4        $TE_{11}$

Mode2

X = −4            $TM_{11}$

X = 0             Hybrid

X = 4             $TE_{21}$

Mode3

X = −4  TE$_{21}$

X = 0  Hybrid

X = 4  TM$_{11}$

ND SPLITTING USING MODE
INTEGRATED POLARIZATION ROTATION AND SPLITTING USING MODE HYBRIDIZATION BETWEEN MULTPLE CORE STRUCTURES

CROSS-REFERENCE TO RELATED APPLICATION(S)

This application claims priority to and the benefit of U.S. Provisional Application Ser. No. 63/018,635, entitled "Method and Architecture on Generating On-Chip Polarization Splitter Rotator," filed May 1, 2020, the entire disclosure of which is hereby incorporated by reference.

STATEMENT AS TO FEDERALLY SPONSORED RESEARCH

This invention was made with government support under the following contracts: Air Force Research Laboratory Contract No. FA8650-15-2-5220, Defense Advanced Research Project Agency (DARPA) Contract No. HR0011-19-C-0083. The government has certain rights in the invention.

TECHNICAL FIELD

This disclosure relates to integrated polarization rotation and splitting using mode hybridization between multiple core structures.

BACKGROUND

Some techniques for integrating a polarization splitter rotator (PSR) structure within a photonic integrated circuit (PIC), or other photonic device, use a ridge-etch structure to break the symmetry in the PSR structure. However, such techniques may only work well for materials with a relatively high index of refraction, such as silicon. For materials with a relatively low index of refraction, to support a second-order transverse electric (TE) mode (e.g., the $TE_{21}$ mode), the width of the waveguide may need to be relatively large, potentially limiting the interactions between the second-order TE mode and a fundamental transverse magnetic (TM) mode (e.g., the $TM_{11}$ mode) as the mode powers are concentrated at different locations. In some cases, the perturbation introduced by a ridge etch may be too small to break the large bi-refringence of the TE and TM polarizations. As a result, a relatively long (e.g., mm-scale) transition may be required to convert the polarization and/or the conversion efficiency may be relatively low, which may be impractical for commercial use.

SUMMARY

In one aspect, in general, an apparatus includes a photonic integrated circuit (PIC) including a plurality of optical waveguides; a polarization rotator structure integrated in the PIC and optically coupled at a first end to at least one of the optical waveguides. The polarization rotator structure includes: a first core structure formed at a first layer, the first core structure extending from the first end to a second end of the polarization rotator structure, and a second core structure formed at a second layer that is at a different depth than the first layer and formed in proximity to the first core structure. The first core structure and the second core structure provide mode hybridization between at least two orthogonally polarized waveguide modes of the polarization rotator structure. The first layer and the second layer are separated by a third layer comprising a material different from a core material of the first core structure and different from a core material of the second core structure, and/or the core material of the first core structure is different from the material of the second core structure. The apparatus also includes an optical splitter structure integrated in the PIC and optically coupled at a first end to the second end of the polarization rotator structure, and optically coupled at a second end to at least two of the optical waveguides, the optical splitter structure including: a first core structure that is contiguous with at least one of the first or second core structures of the polarization rotator structure, and a second core structure that is separate from both of the first and second core structures of the polarization rotator structure.

Aspects can include one or more of the following features.

The first core structure and the second core structure of the polarization rotator structure provide mode hybridization between a $TM_{11}$ mode of the first core structure and a $TE_{21}$ mode of the first core structure.

The second core structure of the polarization rotator structure include at least two separate contiguous portions of the core material extending over at least a portion of the distance between the first end of the polarization rotator structure and the second end of the polarization rotator structure.

In another aspect, in general, an article of manufacture includes: at least one cladding material providing a cladding for a plurality of optical waveguides; a core material providing cores of the optical waveguides, the core material comprising at least one material having a refractive index higher than a refractive index of the cladding material; a first mode coupling structure optically coupled at a first end to at least one optical waveguide formed in the cladding material, the first mode coupling structure including: a first core structure formed at a first layer, the first core structure including at least one contiguous portion of the core material extending from the first end to a second end of the first mode coupling structure, and a second core structure formed at a second layer that is at a different depth than the first layer and formed in proximity to the first core structure, the second core structure including at least two separate contiguous portions of the core material extending over at least a portion of the distance between the first end of the first mode coupling structure and the second end of the first mode coupling structure; and a second mode coupling structure optically coupled at a first end to the second end of the first mode coupling structure, and optically coupled at a second end to at least two optical waveguides formed in the cladding material, the second mode coupling structure including: a third core structure including a portion of the core material that is contiguous with core material of at least one of the first or second core structures, and a fourth core structure including a portion of the core material that is separate from core material of both of the first and second core structures.

Aspects can include one or more of the following features.

The first core structure and the second core structure provide mode hybridization between a fundamental mode of the first core structure having a first polarization and a non-fundamental mode of the first core structure having a second polarization orthogonal to the first polarization.

The portion of the core material of the third core structure is contiguous with the contiguous portion of the core material of the first core structure.

The second mode coupling structure includes a portion of the third core structure and the fourth core structure that are in proximity to each other over a distance that provides evanescent coupling between the non-fundamental mode received in the third core structure and a fundamental mode of the fourth core structure, and preserves a fundamental mode of the third core structure without evanescent coupling to the fourth core structure.

The contiguous portion of the core material of the first core structure has an increasing width over at least a portion of the distance between the first end of the first mode coupling structure and the second end of the first mode coupling structure.

The two separate contiguous portions of the core material of the second core structure have substantially equal widths that increase over a first distance and decrease over a second distance.

The fundamental mode of the first core structure comprises a $TM_{11}$ mode and the non-fundamental mode of the first core structure comprises a $TE_{21}$ mode.

The mode hybridization is based on substantially equal magnitudes of the effective index of the fundamental mode of the first core structure and the effective index of the non-fundamental mode of the first core structure.

The first core structure and the second core structure provide mode hybridization between a fundamental mode of the first core structure having a first polarization and a non-fundamental mode of the second core structure having a second polarization orthogonal to the first polarization.

The portion of the core material of the third core structure is contiguous with the contiguous portion of the core material of the first core structure and is contiguous with one of the two contiguous portions of the core material of the second core structure.

The second mode coupling structure includes a portion of the third core structure and the fourth core structure that are in proximity to each other over a distance that provides evanescent coupling between the non-fundamental mode received in the third core structure and a fundamental mode of the fourth core structure, and preserves a fundamental mode of the third core structure without evanescent coupling to the fourth core structure.

The contiguous portion of the core material of the first core structure has a substantially constant width between the first end of the first mode coupling structure and the second end of the first mode coupling structure.

One of the two separate contiguous portions of the core material of the second core structure overlaps vertically with the contiguous portion of the core material of the first core structure, and one of the one of the two separate contiguous portions of the core material of the second core structure does not overlap vertically with the contiguous portion of the core material of the first core structure.

The fundamental mode of the first core structure comprises a $TM_{11}$ mode and the non-fundamental mode of the second core structure comprises a $TE_{21}$ mode.

In another aspect, in general, method for fabricating a polarization splitter rotator includes: providing at least one cladding material providing a cladding for a plurality of optical waveguides; forming waveguides in the cladding material using core material comprising at least one material having a refractive index higher than a refractive index of the cladding material; forming a first mode coupling structure optically coupled at a first end to at least one optical waveguide formed in the cladding material, the first mode coupling structure including: a first core structure formed at a first layer, the first core structure including at least one contiguous portion of the core material extending from the first end to a second end of the first mode coupling structure, and a second core structure formed at a second layer that is at a different depth than the first layer and formed in proximity to the first core structure, the second core structure including at least two separate contiguous portions of the core material extending over at least a portion of the distance between the first end of the first mode coupling structure and the second end of the first mode coupling structure; and forming a second mode coupling structure optically coupled at a first end to the second end of the first mode coupling structure, and optically coupled at a second end to at least two optical waveguides formed in the cladding material, the second mode coupling structure including: a third core structure including a portion of the core material that is contiguous with core material of at least one of the first or second core structures, and a fourth core structure including a portion of the core material that is separate from core material of both of the first and second core structures.

Aspects can include one or more of the following features.

The first core structure and the second core structure provide mode hybridization between a fundamental mode of the first core structure having a first polarization and a non-fundamental mode of the first core structure having a second polarization orthogonal to the first polarization.

The first core structure and the second core structure provide mode hybridization between a fundamental mode of the first core structure having a first polarization and a non-fundamental mode of the second core structure having a second polarization orthogonal to the first polarization.

Aspects can have one or more of the following advantages.

The techniques described herein can be used for compact and efficient integrated PSR structures formed using either a relatively high index of refraction (e.g., silicon with a refractive index of ~3.5), or a relatively low index of refraction (e.g., silicon nitride with a refractive index of ~2.0), at the operational wavelength(s) of a device. In some implementations, the PSR structure is formed using two layers of core material to create a hybridization of a fundamental TM mode and a non-fundamental TE mode. For example, a transition portion of the structure can include three waveguide cores, with one core in one layer and the other two cores in the other layer. The waveguide cores can be arranged in a "chevron arrangement" (e.g., V-shaped chevron-style or inverted V-shaped inverse-chevron-style), as described in more detail below, to break the up-down symmetry of the combined geometry to enable hybridization of the fundamental TM mode (e.g., $TM_{11}$) and the non-fundamental TE mode (e.g., $TE_{21}$) when the effective refractive indices of the modes are relatively close. Other modes supported by the coupled waveguide will have well-separated effective refractive indices; therefore, the modes are well separated from each other with minimal mutual coupling. In some implementations, more than two layers can be used, as described in more detail below.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The described techniques can be used to fabricate polarization splitter rotators (PSRs). For example, PSRs can be used in polarization diversity modules, or other photonic modules that depend on the polarization rotation and splitting/combining function that is provided, as described in more detail below. In some implementations, the polarization splitter rotators are fabricated on-chip, such as on a photonic integrated circuit (PIC), which can be fabricated on a semiconductor substrate (e.g., a silicon-on-insulator (SOI) platform or other platform that can be fabricated using layers of materials deposited and etched over a substrate). In some implementations, CMOS fabrication processes can be used. Additionally, the techniques described herein allow such fabrication process to yield compact PSR structures without necessarily requiring the use of high-index materials. Since low-index materials tend to exhibit lower propagation loss, the techniques described herein would enable high-performance device implementation, and reduction of cost that would otherwise be associated with the use of high-index material for polarization manipulation.

In some implementations, techniques that can be used to facilitate compact design of a PSR using relatively low-index materials include use of a chevron-style waveguide. In some implementations, a first mode coupling structure provides mode-dependent polarization rotation of light received into an input port such that orthogonally polarized modes (e.g., one TE mode and one TM mode) become co-polarized (e.g., both TE modes), and a second mode coupling structure provides splitting of the co-polarized modes into different output ports. Equivalently, a PSR can also be used in the reverse direction to combine physically separated co-polarized modes into combined and orthogonally polarized modes of a single output port. A chevron-style waveguide includes multiple waveguide cores that are arranged in a chevron arrangement, which is able to break up-down symmetry of a waveguide mode. This break in up-down symmetry enabled by the chevron-style waveguide facilitates mode hybridization in a first mode coupling structure, which enables conversion between a fundamental TM-polarized mode (e.g., $TM_{11}$) and a higher-order TE-polarized mode (e.g., $TE_{21}$), resulting in mode-dependent polarization rotation. Another mode coupling structure enables conversion between the generated higher-order TE-polarized mode received into a first core structure and a fundamental TE-polarized mode (e.g., $TE_{11}$) of another core structure, resulting in splitting of the co-polarized modes into different core structures. The mode hybridization is based on the changing magnitude of the effective refractive index (or simply "effective index") associated with the evolving optical mode of the light that is guided by the changing combined multi-core waveguide structure, as described in more detail below (with reference to FIG. 2B).

Figure 1A:
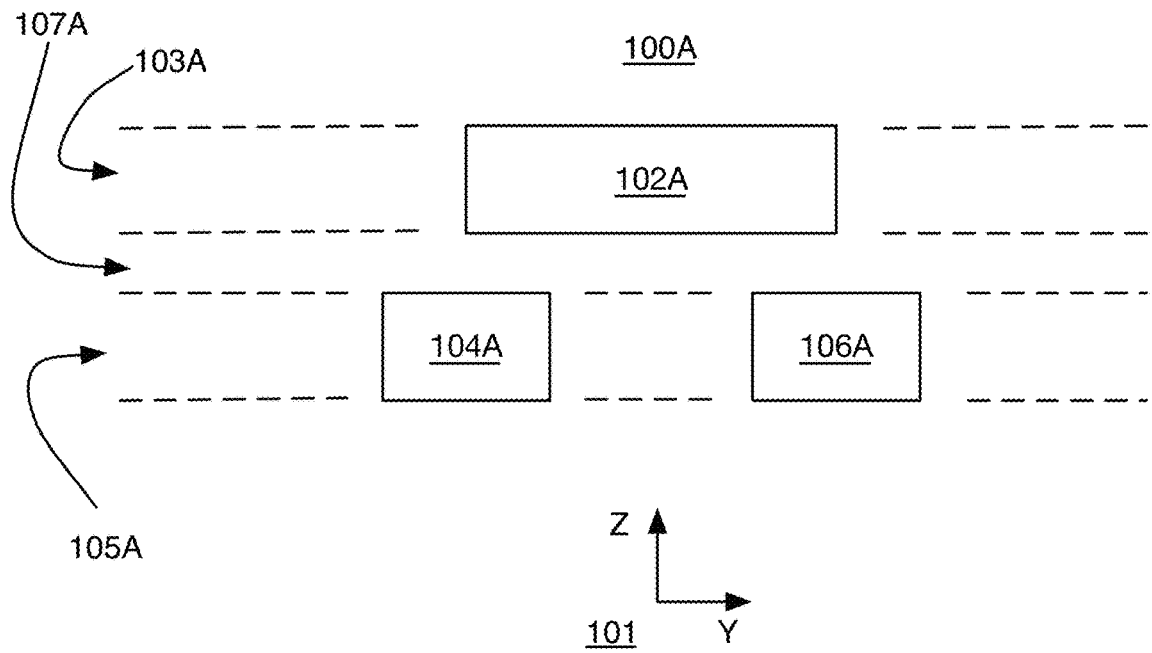
FIGS. 1A-1F are cross-sectional views of examples of different chevron-style or inverse-chevron-style waveguides.
Figure 1B:
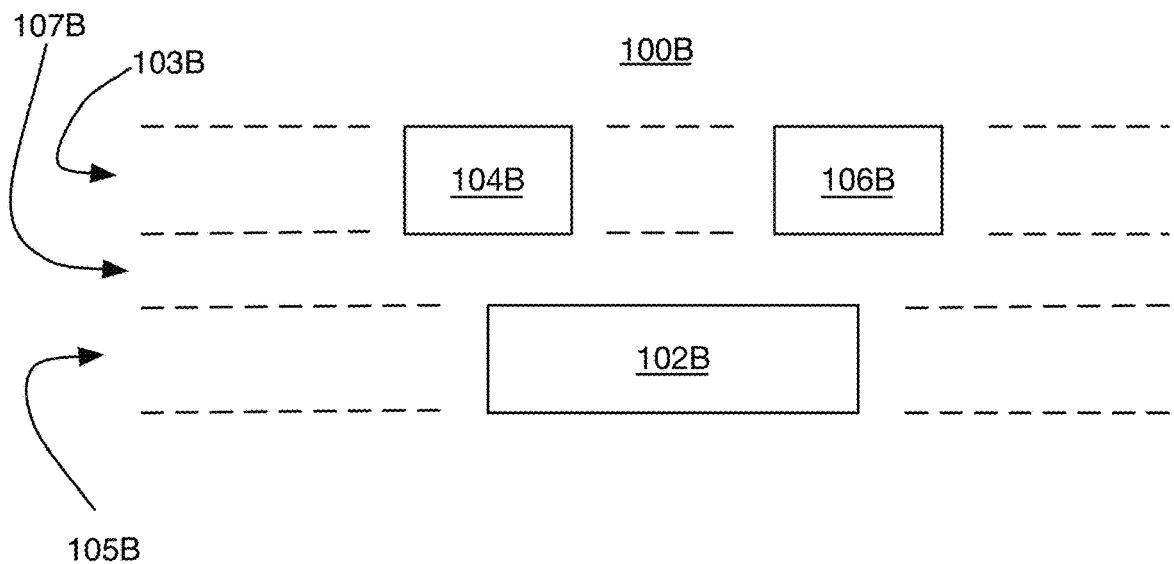

Examples of such chevron arrangements of multi-core waveguides that include different core structures in different layers of a PIC are illustrated by the cross-sections shown in FIGS. 1A-1F. Referring to FIG. 1A, a mode coupling structure 100A includes a top core 102A in a top layer 103A and two bottom cores 104A and 106A in a bottom layer 105A. In this example, there is a gap layer 107A between the top layer 103A and the bottom layer 105A. The cross-sections of the core structures are shown in a y-z plane (relative to a y-z axes 101) that is perpendicular to an x-axis that is the propagation axis of light guided by the multi-core waveguides. The goal of this arrangement is to hybridize two (i.e., in this example $TM_{11}$ and $TE_{21}$) optical modes by breaking the vertical symmetry around the z axis. If there were a single-core waveguide that included only the top core 102A, there would be a fundamental TM-polarized mode $TM_{11}$ that is not coupled to a second-order TE-polarized mode $TE_{21}$ due to an up-down symmetry of the structure. By incorporating the two cores 104A and 106A in the bottom layer 105A in proximity to the core 102A in the top layer 103A, the up-down symmetry is broken and the two modes $TM_{11}$ and $TE_{21}$ can hybridize with each other, as described in more detail below. For example, the multi-core waveguide formed by the mode coupling structure 100A supports a hybridized mode profile based on certain structural characteristics including a relatively thin gap layer 107A and overlap between top core 102A and each of the bottom cores 104A and 106A in the dimension along the y-axis, as shown in FIG. 1A.

A variety of alternative chevron arrangements of multi-core waveguides can be formed. In some implementations, the cores form an inverse-chevron structure, such as in FIG. 1B, which shows a mode coupling structure 100B includes a bottom core 102B in a bottom layer 105B and two top cores 104B and 106B in a top layer 103B. In this example, there is a gap layer 107B between the top layer 103B and the bottom layer 105B.

Figure 1C:
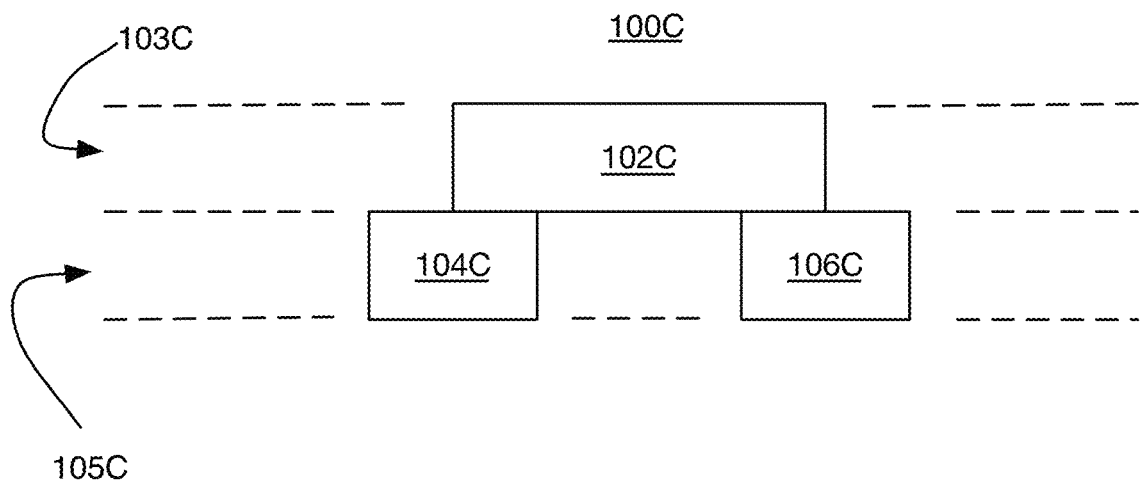
Figure 1D:
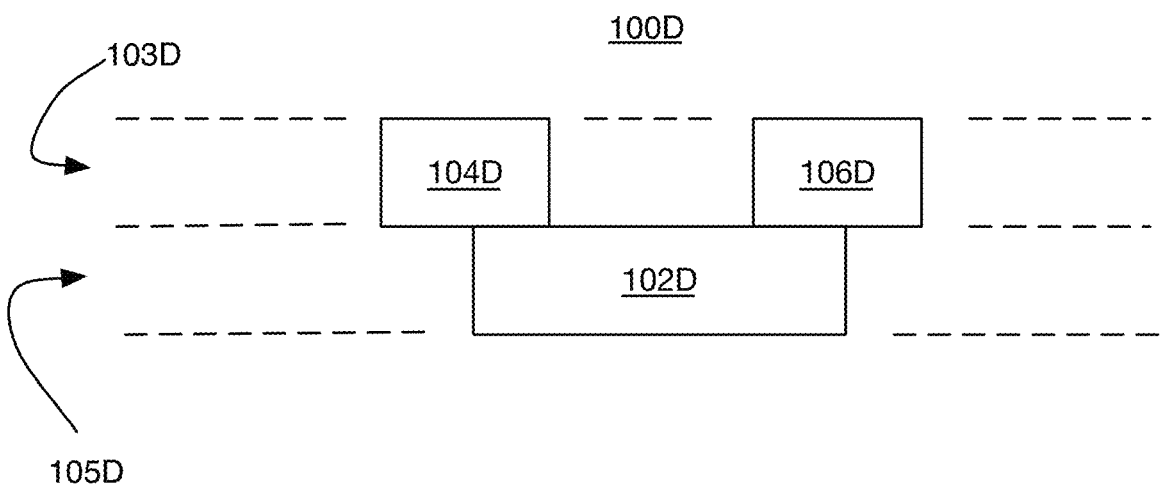

In some implementations, the multiple layers can be formed by patterning a single thicker layer of higher-index core material within a lower-index cladding material providing the surrounding cladding. FIG. 1C shows a chevron-style mode coupling structure 100C that includes a top core 102C in a top layer 103C and two bottom cores 104C and 106C in a bottom layer 105C. FIG. 1D shows an inverse-chevron-style mode coupling structure 100D that includes a bottom core 102D in a bottom layer 105D and two top cores 104D and 106D in a top layer 103D. In these examples of FIGS. 1C and 1D, there is no gap layer between the respective top and bottom layers.

Figure 1E:
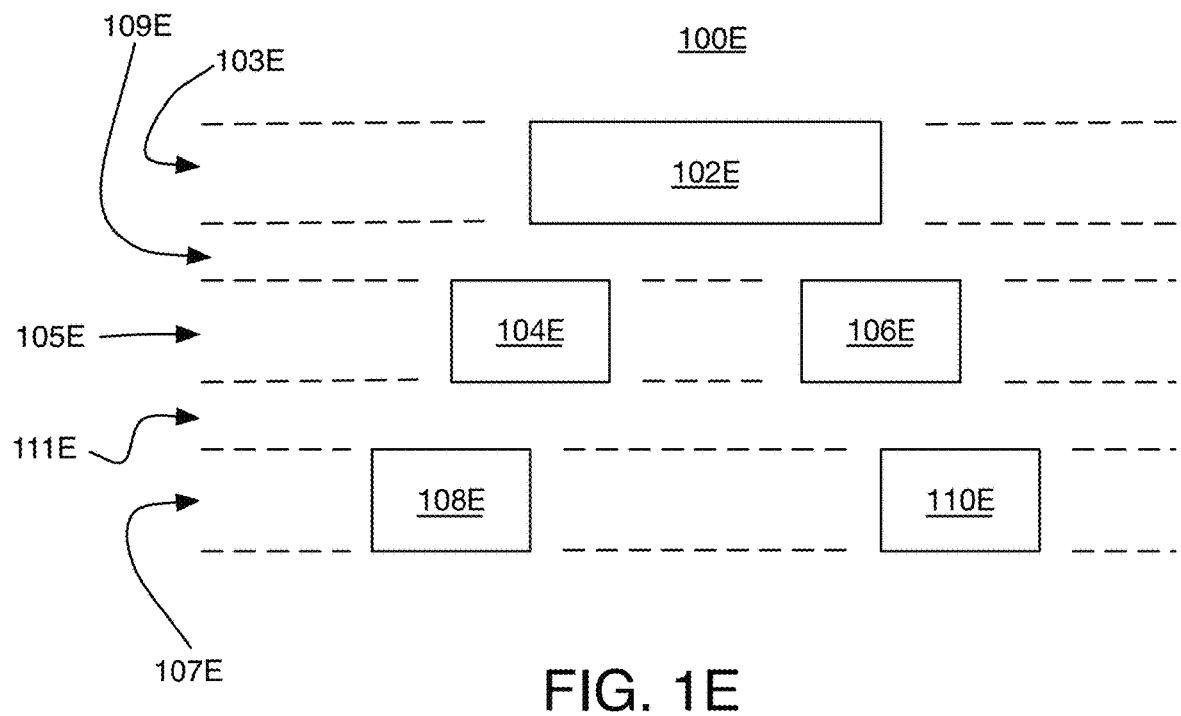
Figure 1F:
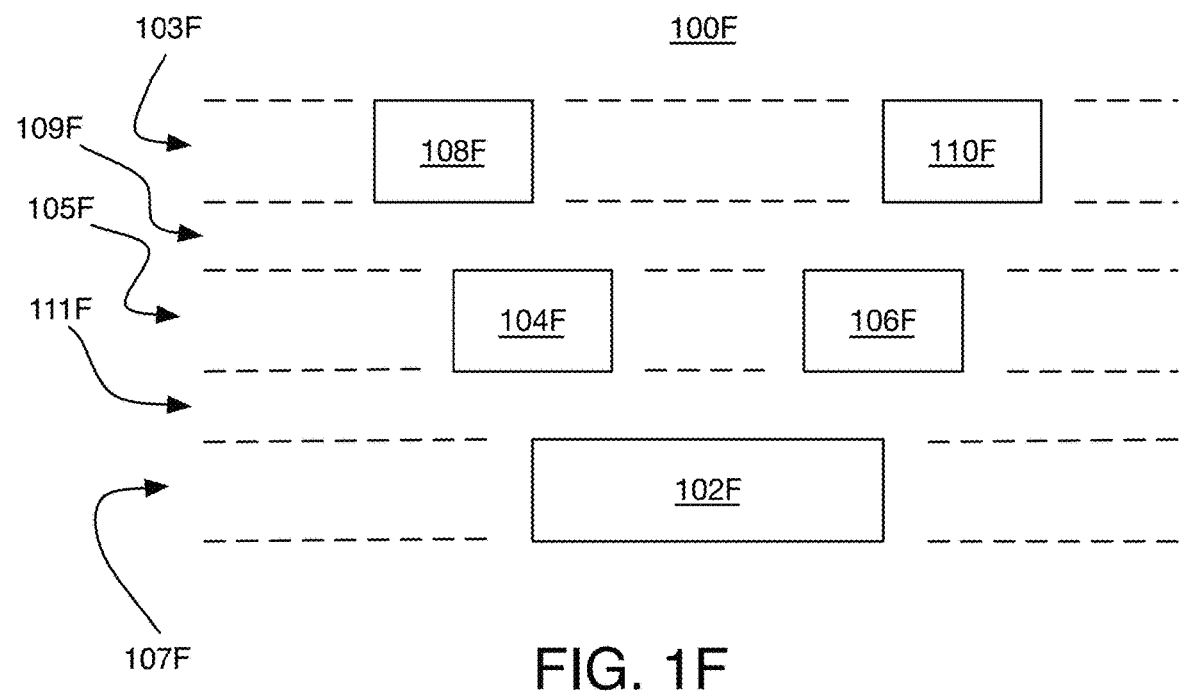

In some implementations, there can be more than two layers forming an extended chevron arrangement of a multi-core waveguide. FIG. 1E shows a chevron-style mode coupling structure 100E that includes a top core 102E in a top layer 103E, two middle cores 104E and 106E in a middle layer 105E, and two bottom cores 108E and 110E in a bottom layer 107E. This example also includes gap layers 109E and 111E, as shown. FIG. 1F shows an inverse-chevron-style mode coupling structure 100F that includes a bottom core 102F in a bottom layer 107F, two middle cores 104F and 106F in a middle layer 105F, and two top cores 108F and 110F in a top layer 103F. This example also includes gap layers 109F and 111F, as shown.

Figure 2A:
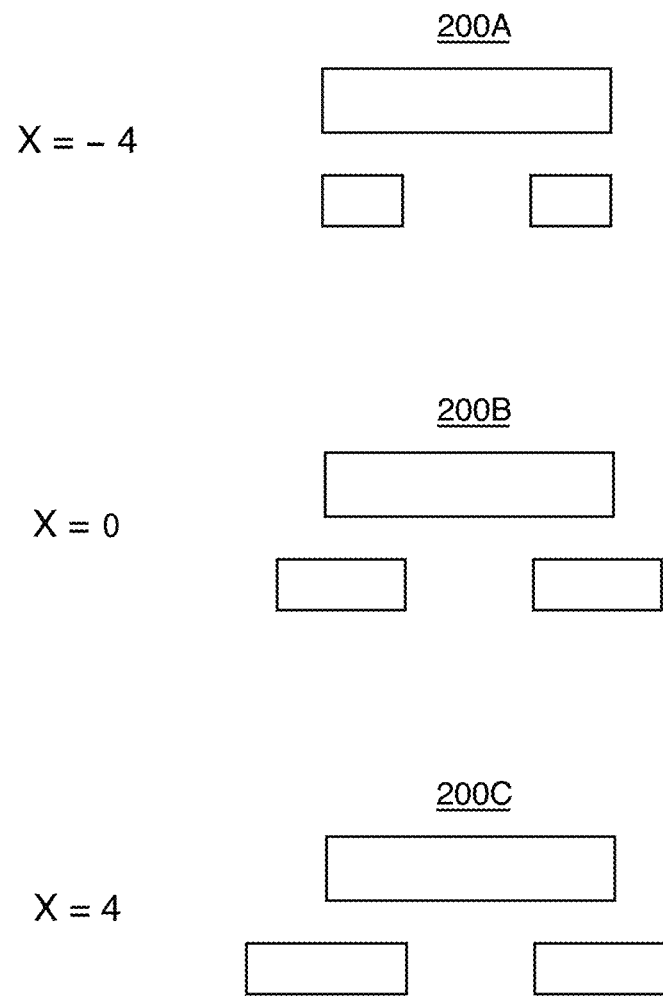
FIG. 2A is a set of waveguide cross-sections for different positions along a multi-core mode coupling waveguide structure.

Another aspect of the multi-core mode coupling structure that enables the mode hybridization is that the widths of the different core structures change as the guided optical wave propagates along the propagation axis (i.e., the x-axis in these examples). For example, the widths of the bottom cores can be adiabatically increased as the guided light propagates. FIG. 2A shows an example of different cross-sections of a multi-core mode coupling structure with increasing widths of the lower cores for three different positions along the x-axis. At X=−4 (in arbitrary distance units) a cross-section 200A show that the bottom cores are narrower and extend to the edges of the top core. Further along at X=0 a cross-section 200B shows that the bottom cores are wider and extend past the edges of the top core. Further along at X=4 a cross-section 200C shows that the bottom cores extend even further past the edges of the top core. This increasing width of the bottom cores enables a mode transition process that is based on mode hybridization.

Figure 2B:
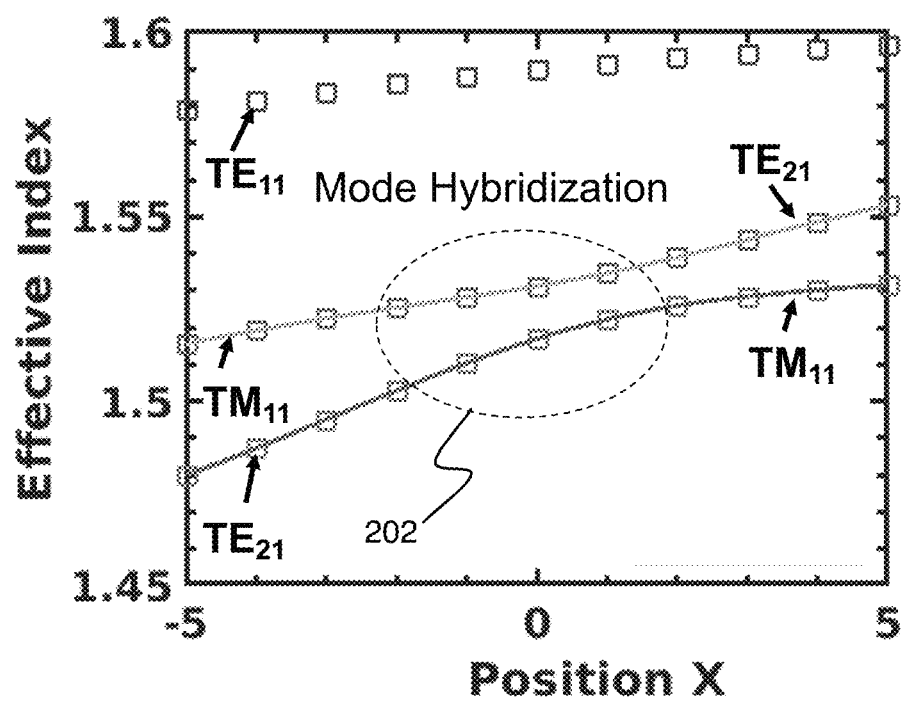
FIG. 2B is a plot of effective index vs. position for eigen-modes of the multi-core waveguide structure.

FIG. 2B shows a plot of effective indices of the first three eigen-modes (labeled as Mode1, Mode2, and Mode3) as a function of position X along the x-axis (in arbitrary distance units) as the bottom core widths are adiabatically increased as the propagation position goes from X=−5 to X=5. A fundamental $1^{st}$-order eigen-mode (Mode1) is a $TE_{ii}$ mode and has the largest effective index that stays well-separated in magnitude (of about 1.58 to 1.60) from the effective indices of the other modes. A $2^{nd}$-order eigen-mode (Mode2) starts as a $TM_{11}$ mode with an effective index of around 1.52, and a $3^{rd}$-order eigen-mode (Mode3) starts as a $TE_{21}$ mode with an effective index of around 1.48. In some cases, since the $3^{rd}$-order mode is relatively weakly supported, all of the initial optical energy starts in the highest order TE mode (Mode1) and the highest order TM mode (Mode2), with no energy in Mode3 or lower order eigen-modes. As light propagates through the mode coupling structure of FIG. 2A, there is a mode hybridization region 202 in which the effective indices of Mode2 and Mode3 approach each other, and the mode transition process turns Mode2 into a $TE_{21}$ mode and Mode3 into a $TM_{11}$ mode through hybridization, while preserving the $TE_{11}$ mode of Mode1.

Figure 2C:
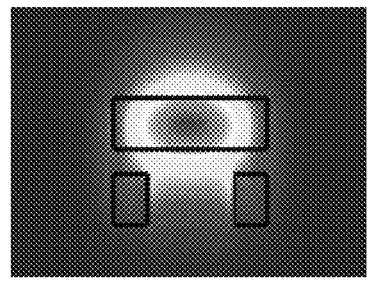
FIGS. 2C, 2D, and 2E are sets of cross-sections of field intensity profiles for different positions along the multi-core waveguide structure.
Figure 2C:
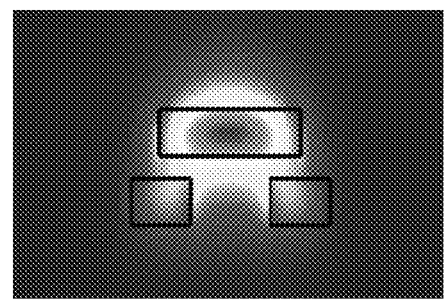
Figure 2C:
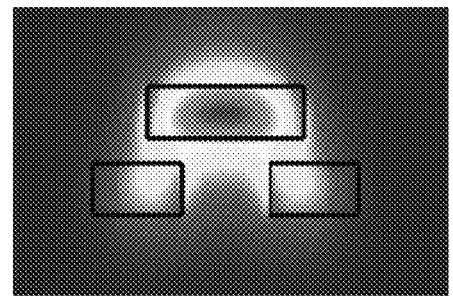
Figure 2D:
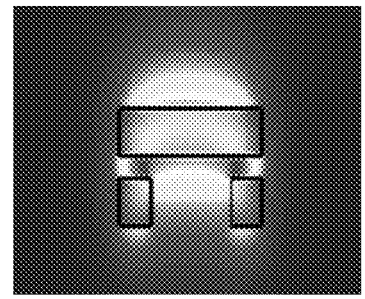
Figure 2D:
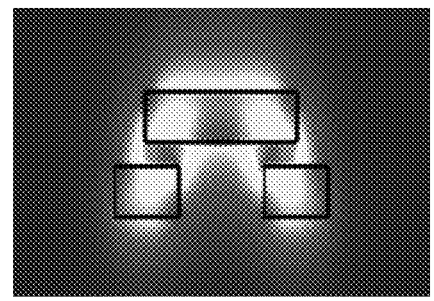
Figure 2D:
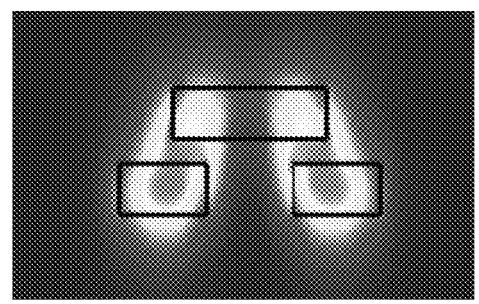
Figure 2E:
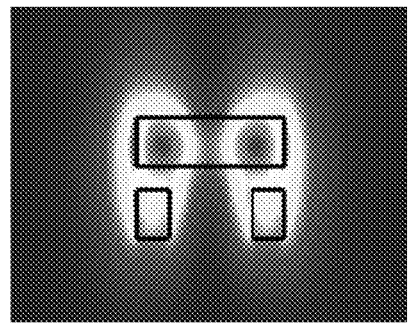
Figure 2E:
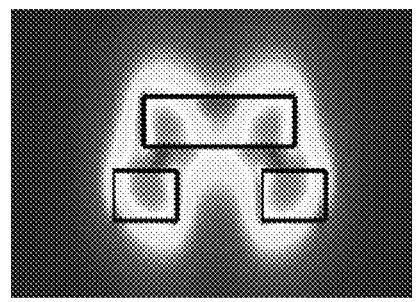
Figure 2E:
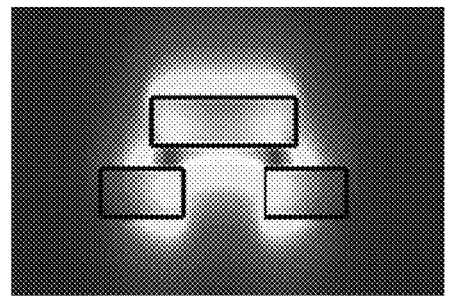

FIGS. 2C-2E show examples of electric field intensity profiles that would result from the mode coupling structure of FIG. 2A as the light propagates through the mode transition process. FIG. 2C illustrates how Mode1 preserves the relative intensity profile and polarization at each of the three cross-section locations shown in FIG. 2A. FIGS. 2D and 2E illustrate how the intensity profile and the polarization modes change for Mode2 and Mode3, resulting in gradual polarization rotation through mode hybridization.

Figure 3A:
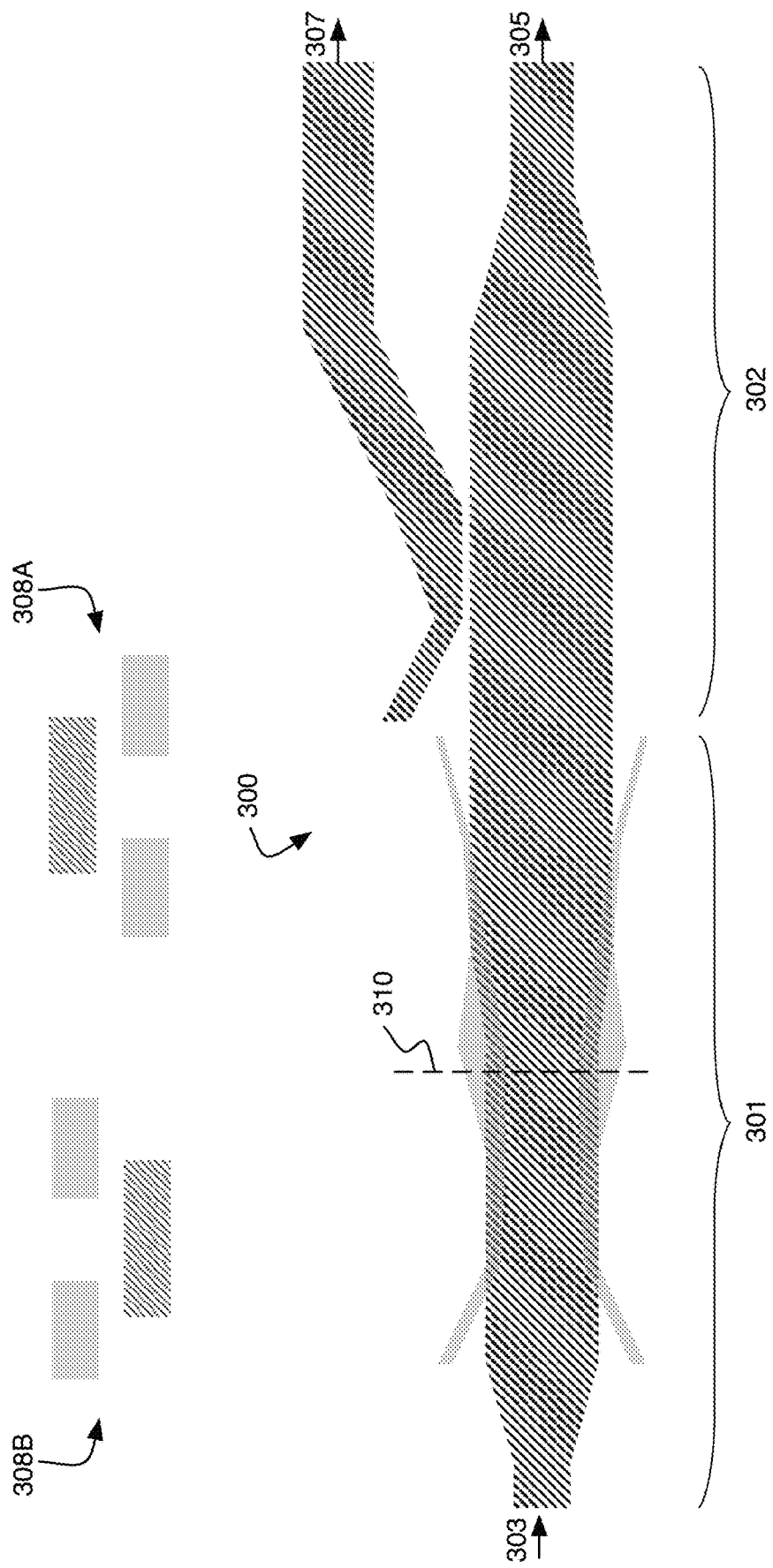
FIG. 3A is a top view and alternative cross-sectional views of an example PSR device.

FIG. 3A shows an example PSR device 300 that includes a polarization rotator mode coupling structure 301 (or simply "rotator 301"), and an optical splitter mode coupling structure 302 (or simply "splitter 302"). The rotator 301 is configured to convert an input $TM_{11}$ mode at an input port 303 into a $TE_{21}$ mode, providing polarization rotation for one eigen-mode of input light, while preserving an input $TE_{11}$ mode without rotation for another eigen-mode of input light. The splitter 302 is configured to preserve the TE polarizations of the two different eigen-modes provided from the rotator 301, but to split the eigen-modes into different respective output ports 305 and 307, as described in more detail below. The multi-core structure of the rotator 301 can have: (1) a chevron-style arrangement with two temporary core structures in a layer below a main core structure as shown in the cross-section 308A at the transverse plane 310, or alternatively (2) an inverse-chevron-style arrangement with two temporary core structures in a layer above a main core structure as shown in the cross-section 308B at the transverse plane 310.

Figure 3B:
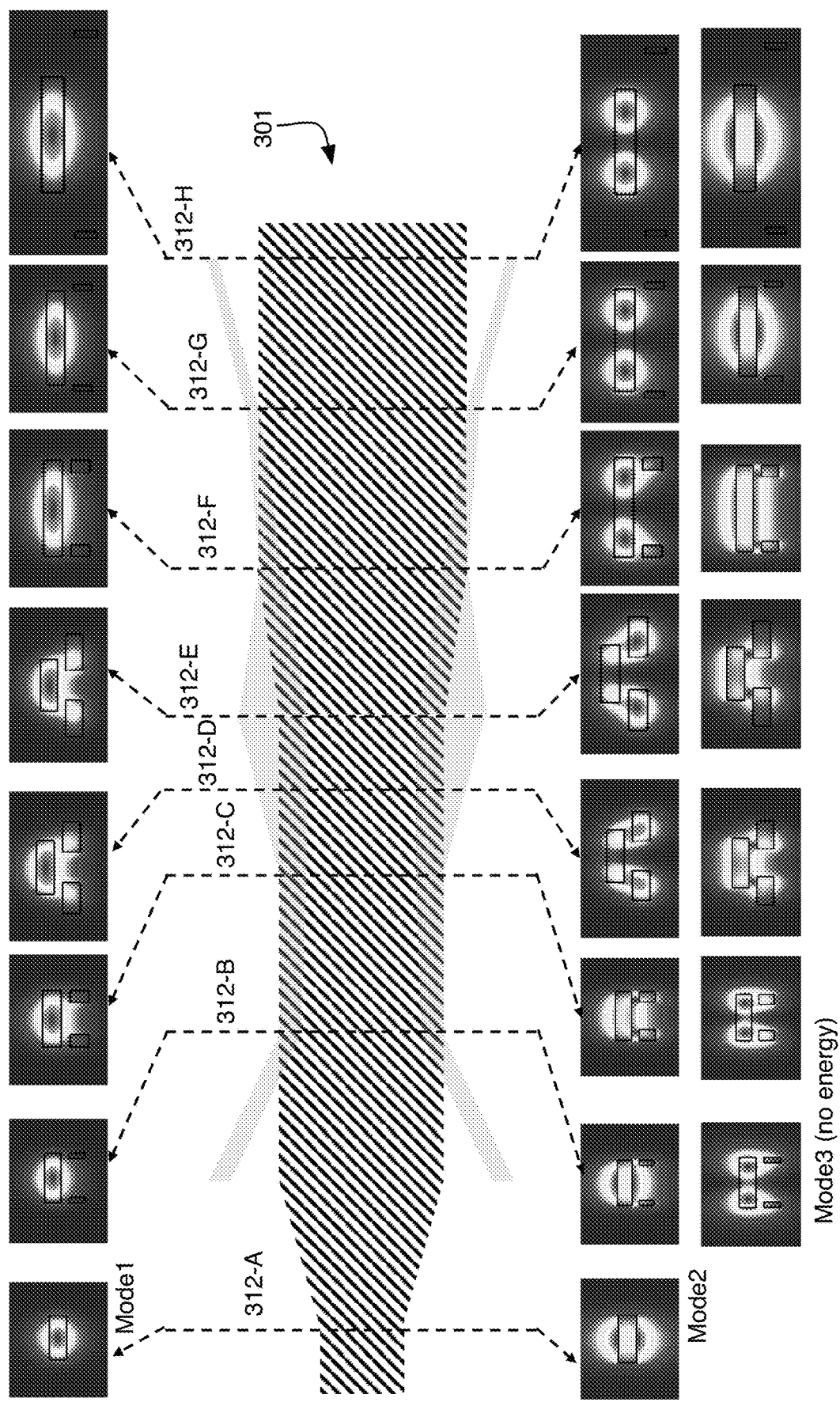
FIG. 3B is a top view with cross-sections of mode profiles at different locations for different eigen-modes of a rotator of the PSR.

FIG. 3B shows cross-sections of mode profiles at different locations along the rotator 301 for three different eigen-modes (Mode1, Mode2, and Mode3) of the rotator 301. Each mode profile image represents the electric field intensity over a cross-sectional plane indicated by the dashed lines 312-A to 312-H. At the left (input) side of the rotator 301, a $1^{st}$-order eigen-mode (Mode1) corresponds to the $TE_{11}$ mode of the input waveguide structure, which starts with a single core that is tapered to a larger size at the right side, as shown. The structure of the rotator 301 changes as the additional cores are moved in and overlapped, then tapered up and then down in width, and then moved out until they no longer overlap. The Mode1 stays a $TE_{11}$ mode over the entire length of the rotator 301. At the left side of the rotator 301, there is also a $2^{nd}$-order eigen-mode (Mode2) that starts as a $TM_{11}$ mode and evolves into a $TE_{21}$ mode at the right side. Also shown in FIG. 3B are the theoretical mode profiles for a $3^{rd}$-order eigen-mode (Mode3) in which there is assumed to be no energy for an input optical wave used with the PSR device 300. But, the existence of this higher-order eigen-mode, which would start as a $TE_{21}$ mode at the left side and evolve into a $TM_{11}$ mode at the right side, contributes to the mode hybridization.

Figure 3C:
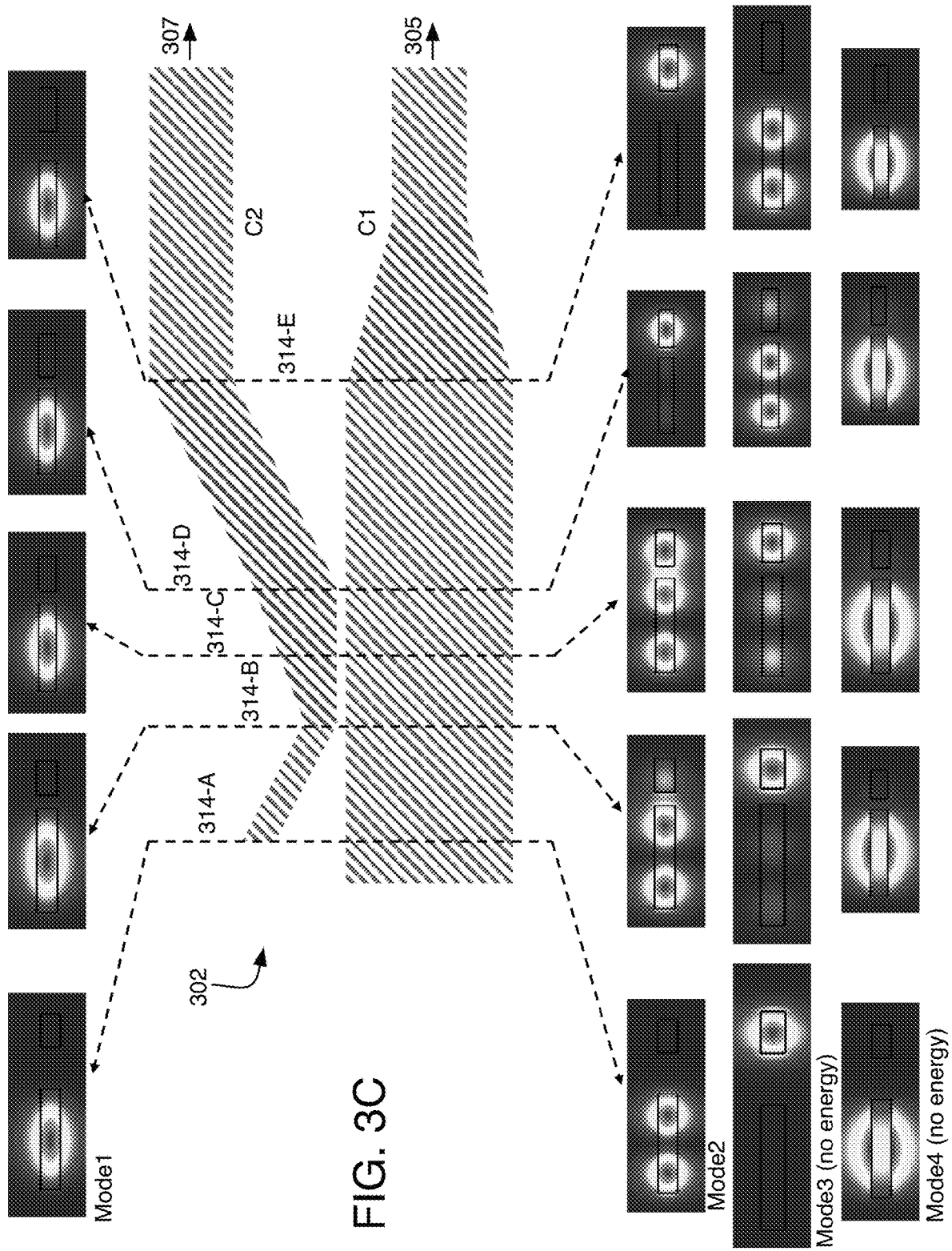
FIG. 3C is a top view with cross-sections of mode profiles at different locations for different eigen-modes of a splitter of the PSR.

The perturbation introduced by the pair of temporary core structures in another layer (on below as in cross-section 308A, or above as in cross-section 308B) in proximity to the main core structure causes a break in the up-down symmetry, which results in hybridization between the $TM_{11}$ mode and the $TE_{21}$ mode. Therefore, through a process of adiabatic transition, the $TM_{11}$ mode profile of Mode2 can evolve through gradually changing hybridized mode profiles into the $TE_{21}$ mode profile. Examples of hybridized mode profiles are shown in FIG. 3C for the cross-sections 312-C, 312-D, and 312-E of the eigen-modes Mode1 and Mode2, which include significant energy in the core structures of both layers. The cross-sections before (312-A and 312B) and the cross-sections after (312-F, 312-G, and 312-H) correspond to adiabatic transition to and from the hybridized modes, respectively, and include significant energy in the main core structure.

FIG. 3C shows cross-sections of mode profiles at different locations along the splitter 302 for four different eigen-modes (Mode1, Mode2, Mode3, and Mode4) of the splitter 302, which includes a lateral core structure with output port 307 in the same layer as the main core structure with output port 305. To achieve the PSR functionality, the lateral core structure is used to separate the two eigen-modes within main core structure from the rotator 301 into two different output waveguides at the output ports 305 and 307. Mode1 of the rotator 301 corresponds to Mode1 of the splitter 302, matching up at the cross-sections 312-H and 314-A of the main core, and propagating to the output port 305 of the main core structure. Mode2 of the rotator 301 corresponds to Mode2 of the splitter 302, matching up at the cross-sections 312-H and 314-A of the main core, and evanescently coupled to the output port 307 of the lateral core structure. Mode3 of the splitter 302 (with no energy in the input light) represents the mode at the input of the lateral core structure at cross-section 314-A, and is evanescently coupled to the output port 305 of the main core structure. Mode3 of the rotator 301 corresponds to Mode4 of the splitter 302 (with no energy in the input light), matching up at the cross-sections 312-H and 314-A of the main core, and propagating to the output port 305. The fundamental eigenmode Mode1 having a $TE_{11}$ mode profile will stay in the main core exiting the output port 305, while the other eigen-mode Mode2 will start with a $TE_{21}$ mode profile in the main core and will be adiabatically converted to a $TE_{11}$ mode profile in the lateral core exiting the output port 307. In the splitter 302, the introduction of another core breaks the in-plane symmetry of the waveguide structure. Therefore, the $TE_{21}$ mode of the wider main core can hybridize with the $TE_{11}$ mode of the narrower lateral core, and through an adiabatic change, the $TE_{21}$ mode of the wider main core can be converted to the $TE_{11}$ mode of the narrower lateral core and separated from the main core with minimal loss.

All the mode profiles shown in FIGS. 3B and 3C illustrate the intensity of the electrical field (i.e., $\sqrt{|E_X|^2+|E_Y|^2+|E_Z|^2}$) for light that starts in the illustrated eigen-mode. However, if no light exists in that eigen-mode within the input light, then the electric field intensity would be zero for that eigen-mode (as for Mode3 in FIG. 3B, and Mode3 and Mode4 in FIG. 3C).

Figure 3D:
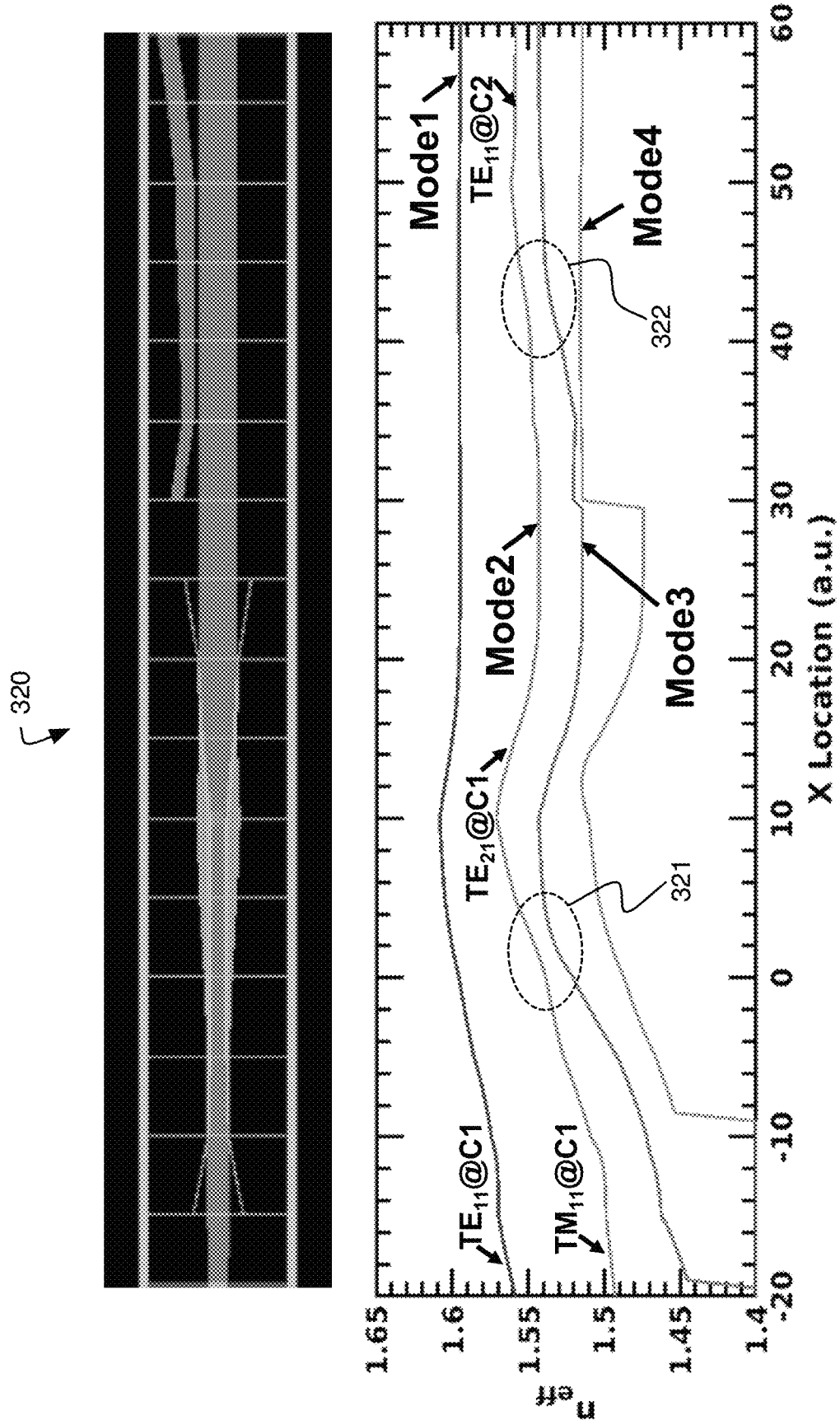
FIG. 3D is a graph of effective refractive indices associated with a simulated waveguide structure.

To further illustrate the adiabatic transition among different transverse mode profiles in the different eigen-modes, FIG. 3D shows a simulated waveguide structure 320 implementing the PSR device 300 and the evolution of the effective refractive indices of the supported eigen-modes. The Mode1 stays in a $TE_{11}$ mode throughout the main core (C1). The two hybridization regions 321 and 322 are examples of mode hybridization associated with the effective index of one eigen-mode having a similar magnitude as the effective index of another eigen-mode. The first hybridization region 321 enables the transition between the $TM_{11}$ mode and the $TE_{21}$ mode for Mode2. The second hybridization region 322 enables the transition between the $TE_{21}$ mode of the wider main core (C1) and the $TE_{11}$ mode of the narrower lateral core (C2) for Mode2, as described above.

Figure 4A:
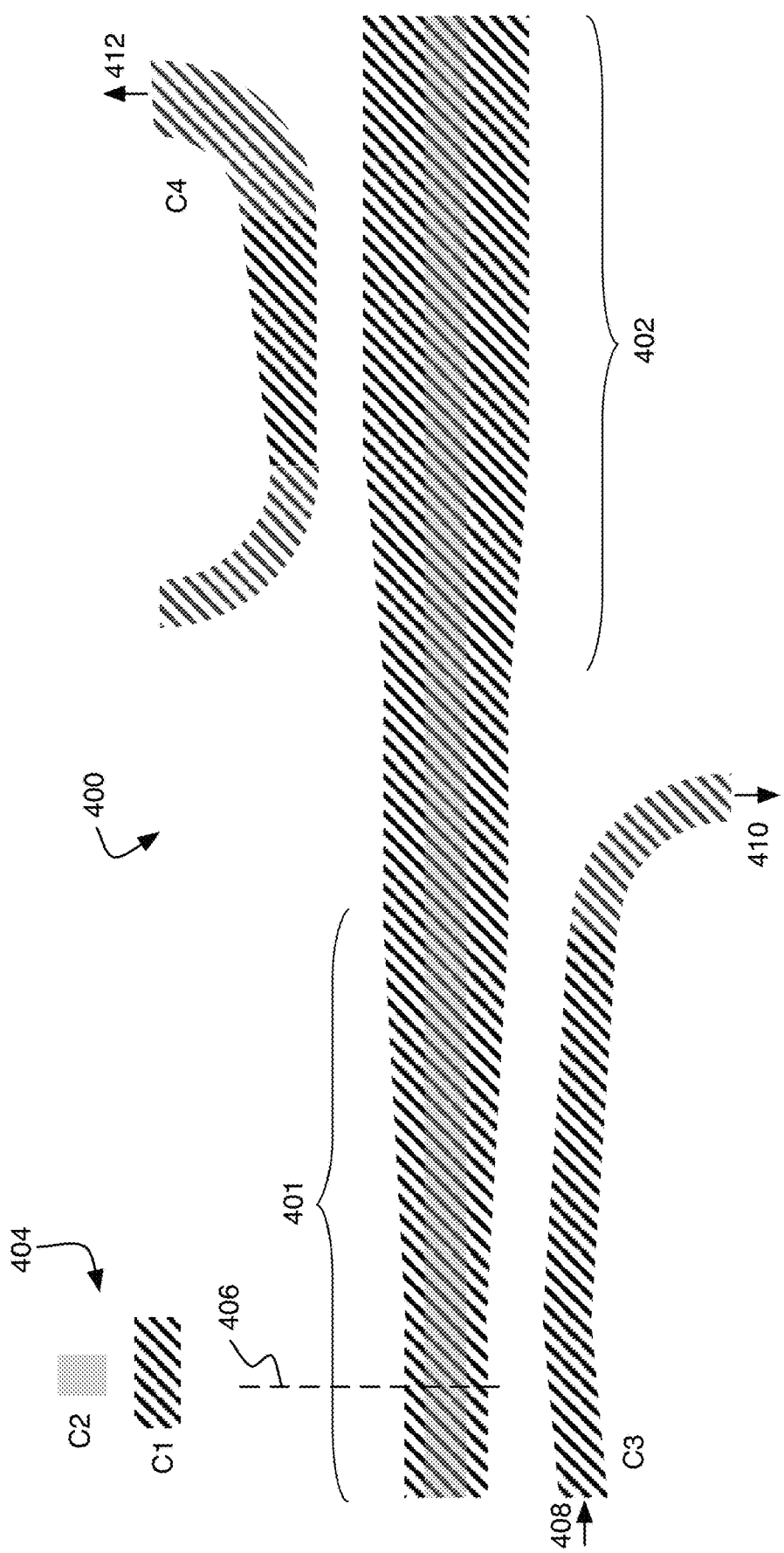
FIG. 4A is a top view and cross-sectional view of an example PSR device.

Other techniques and device structures can also be used for fabricating a PSR. FIG. 4A shows another example PSR device 400. Instead of rotation (by transitioning a fundamental $TM_{11}$ mode to a $TE_{21}$ mode) in one structure and splitting in a subsequent structure as in the PSR device 300, the PSR device 400 enables a transition from the $TM_{11}$ mode of one multi-core waveguide structure to the $TE_{21}$ mode of a different waveguide, effectively achieving polarization rotation and splitting at the same time in a multi-core waveguide structure. The operation of the PSR device 400 will be described with respect to a first mode coupling structure 401 and a second mode coupling structure 402, which include a wider core structure (C1) in a lower layer and a narrower core structure (C2) in an upper layer, as shown in the cross-section 404 at the transverse plane 406, and two lateral core structures (C3, C4). There is an input port 408 receiving input light into core C3, and two output ports 410 and 412 providing the rotated (co-polarized) and split portions of the output light.

Figure 4B:
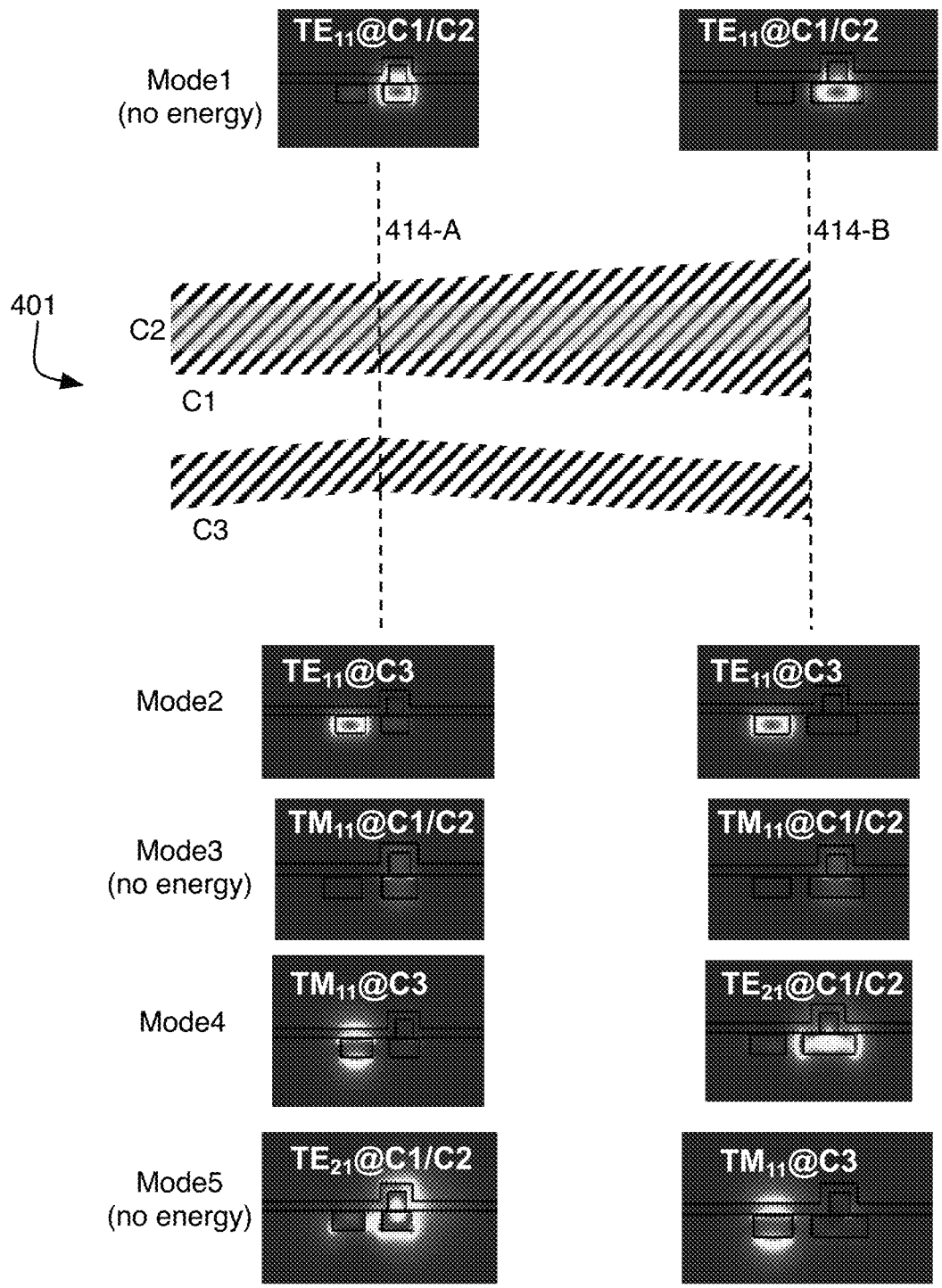
FIG. 4B is a top view with cross-sections of mode profiles at different locations for different eigen-modes of a first mode coupling structure.

FIG. 4B shows the mode transition in the first mode coupling structure 401. By slowly tapering up the width of the core C1, the $TM_{11}$ mode of the lateral core C3 begins hybridization with the $TE_{21}$ mode of the multi-core structure comprising cores C1 and C2, and eventually evolves into the $TE_{21}$ mode of the lateral core C3 with an adiabatic transition, to be output at the output port 410 (FIG. 4A). The mode profiles at cross-sections 414-A and 414-B are shown for four eigenmodes, Mode1, Mode2, Mode3, and Mode4, with the input light including energy only in Mode2 and Mode4 at input port 408.

Figure 4C:
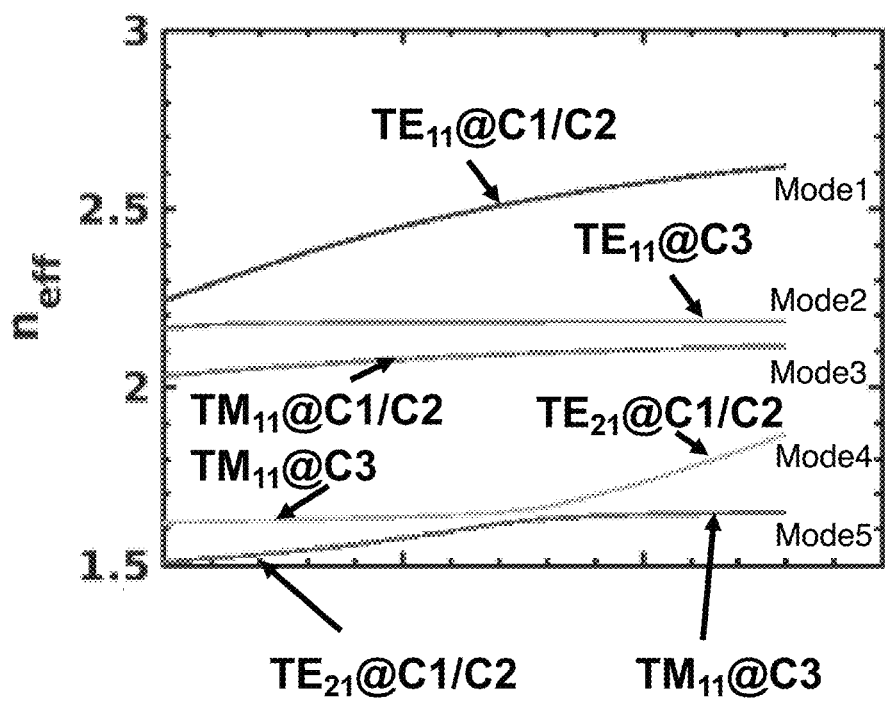
FIG. 4C is graph of effective refractive indices for the structure of FIG. 4B.

The corresponding evolution of the effective refractive indices of the different eigen-modes of the mode coupling structure 401 are shown in FIG. 4C, indicating transitions between different transverse mode profiles. The $TE_{11}$ mode of Mode2 is maintained in core C3. The $TM_{11}$ mode of Mode4 evolves to the $TE_{21}$ mode of the multi-core structure of C1/C2 through mode hybridization.

Figure 4D:
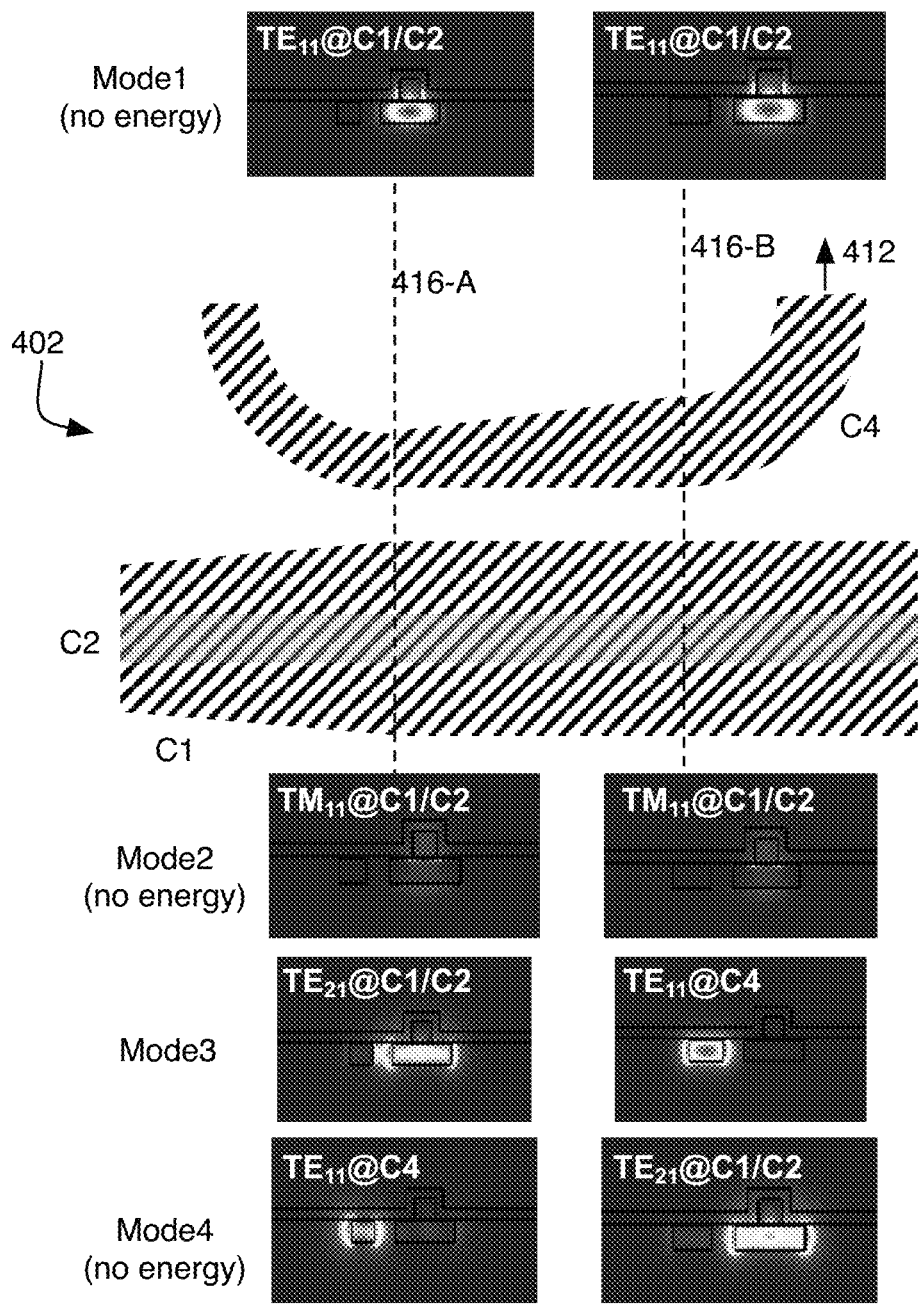
FIG. 4D is a top view with cross-sections of mode profiles at different locations for different eigen-modes of a second mode coupling structure.

FIG. 4D shows the mode transition in the second mode coupling structure 402. By slowly further tapering up the width of core C1, the $TE_{21}$ mode of the multi-core structure comprising cores C1 and C2 begins hybridization with the $TE_{11}$ mode of the lateral core C4 and eventually evolves into the $TE_{11}$ mode of the lateral core C4 with an adiabatic transition, to be output at the output port 412.

Figure 4E:
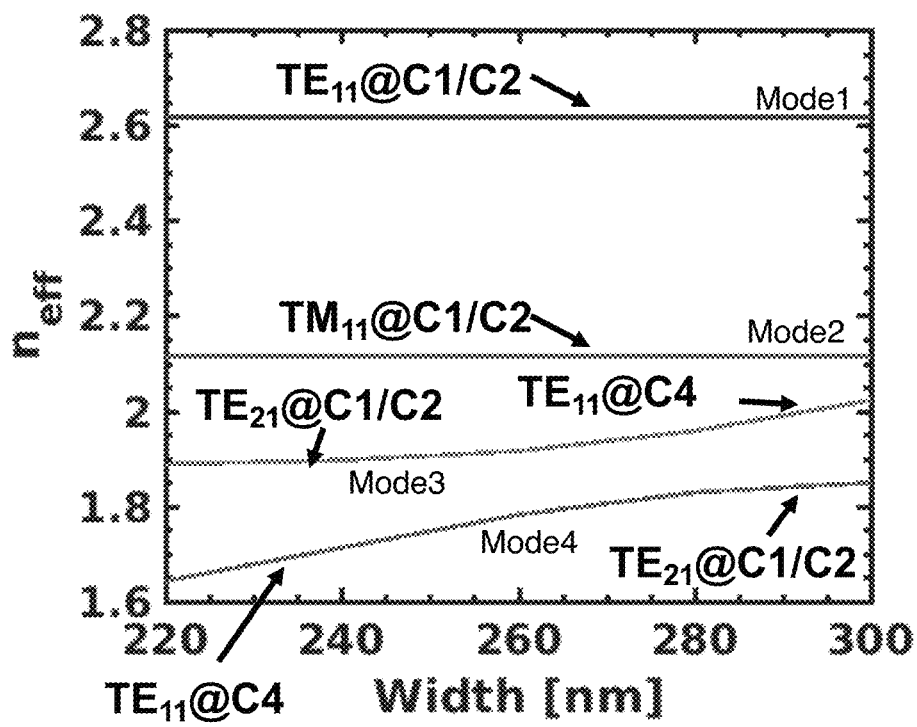
FIG. 4E is graph of effective refractive indices for the structure of FIG. 4D.

The corresponding evolution of the effective refractive indices of the different eigen-modes of the mode coupling structure 402 are shown in FIG. 4E, indicating transitions between different transverse mode profiles. The $TE_{21}$ mode of Mode3 evolves into the $TE_{11}$ mode of the core C4 through mode hybridization.

In addition to the example embodiments described herein, a variety of arrangements are possible for on-chip PSR devices based on the coupling between fundamental mode (e.g., a $TM_{11}$ mode) and a higher-order TE mode (e.g., the $2^{nd}$ order $TE_{21}$). A multi-core waveguide structure can be formed using two or more layers, or a single layer with a partial etch of the layer used to form multiple core structures. For example, a single layer can be etched from top and bottom to form adjacent core structures, as shown in FIGS. 1C and 1C.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. An apparatus comprising:
a photonic integrated circuit (PIC) including a plurality of optical waveguides;
a polarization rotator structure integrated in the PIC and optically coupled at a first end to at least one of the optical waveguides, the polarization rotator structure including:
a first core structure formed at a first layer, the first core structure extending from the first end to a second end of the polarization rotator structure, and
a second core structure formed at a second layer that is at a different depth than the first layer and formed in proximity to the first core structure,
wherein the first core structure and the second core structure provide mode hybridization between at least two orthogonally polarized waveguide modes of the polarization rotator structure, and wherein the first layer and the second layer are separated by a third layer comprising a material different from a core material of the first core structure and different from a core material of the second core structure, and/or the core material of the first core structure is different from the material of the second core structure; and an optical splitter structure integrated in the PIC and optically coupled at a first end to the second end of the polarization rotator structure, and optically coupled at a second end to at least two of the optical waveguides, the optical splitter structure including:

a first core structure that is contiguous with at least one of the first or second core structures of the polarization rotator structure, and a second core structure that is separate from both of the first and second core structures of the polarization rotator structure.

2. The apparatus of claim 1, wherein the first core structure and the second core structure of the polarization rotator structure provide mode hybridization between a $TM_{11}$ mode of the first core structure and a $TE_{21}$ mode of the first core structure.

3. The apparatus of claim 1, wherein the second core structure of the polarization rotator structure include at least two separate contiguous portions of the core material extending over at least a portion of the distance between the first end of the polarization rotator structure and the second end of the polarization rotator structure.

4. An article of manufacture comprising:

at least one cladding material providing a cladding for a plurality of optical waveguides;

a core material providing cores of the optical waveguides, the core material comprising at least one material having a refractive index higher than a refractive index of the cladding material;

a first mode coupling structure optically coupled at a first end to at least one optical waveguide formed in the cladding material, the first mode coupling structure including:

a first core structure formed at a first layer, the first core structure including at least one contiguous portion of the core material extending from the first end to a second end of the first mode coupling structure, and a second core structure formed at a second layer that is at a different depth than the first layer and formed in proximity to the first core structure, the second core structure including at least two separate contiguous portions of the core material extending over at least a portion of the distance between the first end of the first mode coupling structure and the second end of the first mode coupling structure; and a second mode coupling structure optically coupled at a first end to the second end of the first mode coupling structure, and optically coupled at a second end to at least two optical waveguides formed in the cladding material, the second mode coupling structure including:

a third core structure including a portion of the core material that is contiguous with core material of at least one of the first or second core structures, and a fourth core structure including a portion of the core material that is separate from core material of both of the first and second core structures.

5. The article of manufacture of claim 4, wherein the first core structure and the second core structure provide mode hybridization between a fundamental mode of the first core structure having a first polarization and a non-fundamental mode of the first core structure having a second polarization orthogonal to the first polarization.

6. The article of manufacture of claim 5, wherein the portion of the core material of the third core structure is contiguous with the contiguous portion of the core material of the first core structure.

7. The article of manufacture of claim 6, wherein the second mode coupling structure includes a portion of the third core structure and the fourth core structure that are in proximity to each other over a distance that provides evanescent coupling between the non-fundamental mode received in the third core structure and a fundamental mode of the fourth core structure, and preserves a fundamental mode of the third core structure without evanescent coupling to the fourth core structure.

8. The article of manufacture of claim 5, wherein the contiguous portion of the core material of the first core structure has an increasing width over at least a portion of the distance between the first end of the first mode coupling structure and the second end of the first mode coupling structure.

9. The article of manufacture of claim 8, wherein the two separate contiguous portions of the core material of the second core structure have substantially equal widths that increase over a first distance and decrease over a second distance.

10. The article of manufacture of claim 5, wherein the fundamental mode of the first core structure comprises a $TM_{11}$ mode and the non-fundamental mode of the first core structure comprises a $TE_{21}$ mode.

11. The article of manufacture of claim 5, wherein the mode hybridization is based on substantially equal magnitudes of the effective index of the fundamental mode of the first core structure and the effective index of the non-fundamental mode of the first core structure.

12. The article of manufacture of claim 4, wherein the first core structure and the second core structure provide mode hybridization between a fundamental mode of the first core structure having a first polarization and a non-fundamental mode of the second core structure having a second polarization orthogonal to the first polarization.

13. The article of manufacture of claim 12, wherein the portion of the core material of the third core structure is contiguous with the contiguous portion of the core material of the first core structure and is contiguous with one of the two contiguous portions of the core material of the second core structure.

14. The article of manufacture of claim 13, wherein the second mode coupling structure includes a portion of the third core structure and the fourth core structure that are in proximity to each other over a distance that provides evanescent coupling between the non-fundamental mode received in the third core structure and a fundamental mode of the fourth core structure, and preserves a fundamental mode of the third core structure without evanescent coupling to the fourth core structure.

15. The article of manufacture of claim 12, wherein the contiguous portion of the core material of the first core structure has a substantially constant width between the first end of the first mode coupling structure and the second end of the first mode coupling structure.

16. The article of manufacture of claim 15, wherein one of the two separate contiguous portions of the core material of the second core structure overlaps vertically with the contiguous portion of the core material of the first core structure, and one of the one of the two separate contiguous portions of the core material of the second core structure does not overlap vertically with the contiguous portion of the core material of the first core structure.

17. The article of manufacture of claim 12, wherein the fundamental mode of the first core structure comprises a $TM_{11}$ mode and the non-fundamental mode of the second core structure comprises a $TE_{21}$ mode.

18. A method for fabricating a polarization splitter rotator, the method comprising:

providing at least one cladding material providing a cladding for a plurality of optical waveguides;

forming waveguides in the cladding material using core material comprising at least one material having a refractive index higher than a refractive index of the cladding material;

forming a first mode coupling structure optically coupled at a first end to at least one optical waveguide formed in the cladding material, the first mode coupling structure including:

a first core structure formed at a first layer, the first core structure including at least one contiguous portion of the core material extending from the first end to a second end of the first mode coupling structure, and a second core structure formed at a second layer that is at a different depth than the first layer and formed in proximity to the first core structure, the second core structure including at least two separate contiguous portions of the core material extending over at least a portion of the distance between the first end of the first mode coupling structure and the second end of the first mode coupling structure; and forming a second mode coupling structure optically coupled at a first end to the second end of the first mode coupling structure, and optically coupled at a second end to at least two optical waveguides formed in the cladding material, the second mode coupling structure including:

a third core structure including a portion of the core material that is contiguous with core material of at least one of the first or second core structures, and a fourth core structure including a portion of the core material that is separate from core material of both of the first and second core structures.

19. The method of claim 18, wherein the first core structure and the second core structure provide mode hybridization between a fundamental mode of the first core structure having a first polarization and a non-fundamental mode of the first core structure having a second polarization orthogonal to the first polarization.

20. The method of claim 18, wherein the first core structure and the second core structure provide mode hybridization between a fundamental mode of the first core structure having a first polarization and a non-fundamental mode of the second core structure having a second polarization orthogonal to the first polarization.

* * * * *